United States Patent [19]

Ende

[11] Patent Number: 4,880,405
[45] Date of Patent: Nov. 14, 1989

[54] UNIVERSAL JOINT OF THE CARDAN TYPE

[75] Inventor: Eberhard Ende, Essen, Fed. Rep. of Germany

[73] Assignee: Gelenkwellenbau GmbH, Essen, Fed. Rep. of Germany

[21] Appl. No.: 130,306

[22] Filed: Dec. 9, 1987

[30] Foreign Application Priority Data

Dec. 9, 1986 [DE] Fed. Rep. of Germany ....... 3641956

[51] Int. Cl.⁴ ............................................... F15D 3/41
[52] U.S. Cl. ...................................... 464/14; 464/134; 464/136
[58] Field of Search ................... 464/14, 134, 135, 136

[56]   References Cited
U.S. PATENT DOCUMENTS

| | | | |
|---|---|---|---|
| 4,272,972 | 6/1981 | James | 464/134 X |
| 4,541,818 | 9/1985 | Olschewski et al. | 464/134 |
| 4,650,440 | 3/1987 | Fisher | 464/14 |
| 4,702,722 | 10/1987 | Narue et al. | 464/134 X |

FOREIGN PATENT DOCUMENTS

| | | | |
|---|---|---|---|
| 1231736 | 10/1960 | France | 464/14 |
| 889936 | 12/1981 | U.S.S.R. | 464/14 |

*Primary Examiner*—Daniel P. Stodola
*Attorney, Agent, or Firm*—Toren, McGeadt & Associates

[57]   ABSTRACT

A Cardan type universal joint is provided with cross-sectional recesses at specific points either in a joint cross or at the joint yokes in order to improve the load distribution. Because of the arrangement of the recesses, it is possible to achieve an improved and approximately symmetrical load distribution toward the direction of circumferential force to be applied to the joint. This permits an increase in the useful life or alternately an optimization of the construction size of the joint.

7 Claims, 3 Drawing Sheets

UNIVERSAL JOINT OF THE CARDAN TYPE

FIELD AND BACKGROUND OF THE INVENTION

The present invention relates in general to universal joins of the Cardan type and in particular to a new and useful universal joint comprising a first and second joint yoke with throughbores arranged at the ends of the yoke arms of the joint yokes, whose axes lie in a common plane, a trunnion cross comprising four trunnions arranged in a common plane at right angles with respect to each other, and bearing cups placed upon the trunnions with interposition of bearing members, whereby, respectively, two trunnions lying in the same axis together with the bearing cups are received and secured in the two bores of the first joint yoke and to the other trunnions together with the bearing cups are received and secured in the two bores of the second joint yoke.

In such universal joints of the Cardan type, there exists the problem that because of the construction of the yoke arms, there are unequal cross-sectional conditions along the bore and with this, unequal strength and strain conditions in the radial cross-sectional planes of the bore which receives the bearing cups. This results in an unsymmetrical and, thus, unfavorable load distribution, particularly upon the bearing components of the universal joint. The force transmittal occurs preponderantly through the bearing sector which is to be assigned to the stiffer portion of the yoke arm. The other portion of the joint support responsible for the circumferential force transmittal carries a lesser proportion of the load because of the increased elasticity of the end of the yoke arm and, thus, is not completely utilized as far as its capacity of transmittal is concerned. From this, there follows a partial overload of the joint cross support in the stiffer portion of the yoke arms of the joint yoke. This causes a definite reduction in the useful life of the joint because of premature material fatigue.

Thus, the principal direction of force transmittal deviates from the direction of torque transmittal, wherein, in addition, there arises a force component in the direction of the axis which leads to a migration of the two trunnion arms away from each other because said force component acts eccentrically ofthe axis of rotation of the respective joint yoke.

SUMMARY OF THE INVENTION

The present invention is based upon the task of improving the load distribution in the joint component. The invention strives to achieve as uniform a distribution of force as possible.

This task is solved in the invention in that the trunnions comprise recesses emanating from their end faces and extending in a direction toward the center of the trunnion cross. The recesses are designed to be mirror image symmetrical with respect to the plane containing the axes of rotation of the joint yokes and the two associated trunnions. This is with the joint in nondeflected, and, thus, in-line position. These recesses are, however, arranged to be offset with respect to the axis of rotation of the trunnions in the direction of the connected ends of the yoke arms. Herein, the recesses can be designed as stepped cylindrical bores or, for instance, as conical bores. The respectively larger diameter then lies in the front face of the associated trunnion.

Alternately, it is also possible that the yoke arms comprise in the surfaces facing each other and/or at their outer surfaces one recess passing through or several recesses which are designed to be respectively mirror image symmetrical to the plane containing the axes of rotation of the associated joint yoke and of the two throughbores. These recesses are arranged in the region of the plane extending between the wall of the bore and the connecting end of the yoke arms. Herein, the recesses can be designed as segments of a circular annulus or as slots extending concentrically to the axis of the throughbore which reach from the inner surface to the outer surface of the yoke arms.

In the case of the assignment of the recesses to the trunnion, there are arranged so as to be offset, originating from the central plane of the trunnion cross containing the axes of all trunnions and, indeed, in such a manner that the recesses which are assigned to the first pair of trunnions having a common trunnion axis are offset to one side of the central plane and the recesses of the other pair of trunnions are offset to the opposite side of the central plane.

The shape of the recesses can be chosen in a random manner and is to be determined from case to case as a function of the existing load conditions.

The symmetrical arrangement assures that the same conditions are created for both directions of rotation. The solution in the invention results in an improved radial load distribution by modification of the components as far as their elastic behavior is concerned. In particular, a symmetrical load distribution is created, whereby the point of the highest stress is also shifted in the direction of the circumferential force producing the torque. The improved load distribution also entails an increase in the useful life or, in reverse, an optimization of the components. In this way, a more compact construction can be achieved for a desired useful life.

Accordingly, an object of the present invention is to provide a Cardan type universal joint comprising: first and second joint yokes, each having a connecting end with a pair of yoke arms; a bore in each yoke arm; the bores of one joint yoke lying on a common axis and the axes of the bores of both joint yokes lying in a common plane; and a trunnion cross having four trunnions, each mounted for rotation in one bore of said joint yokes for pivotally connecting said joint yokes together, said connected together joint yokes having an in-line position with a common rotation axis; each trunnion having an end face with a recess therein extending toward the center of said trunnion cross, the recesses of the trunnions for one joint yoke being mirror image symmetrical to each other with respect to a plane containing said rotation axis and the trunnions of the other joint yoke; the recesses of the trunnions for each joint yoke being offset along said rotation axis from said common plane toward the connecting end of that joint yoke.

Another object of the present invention is to provide recesses in the yoke arms of the joint yokes rather than in the trunnions thereof, the recesses being offset along the rotation axis from the common plane toward the connecting end of the respective joint yokes.

A still further object of the present invention is to provide a universal joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings, as descriptive matter, in which preferred embodiments of the invention are illustrated.

BRIEF DESCRIPTION OF THE DRAWINGS

Two embodiments of the invention are illustrated in the drawing, wherein.

DETAILED DESCRIPTION OF THE PREFERRED EMBODIMENTS

Figure 1:
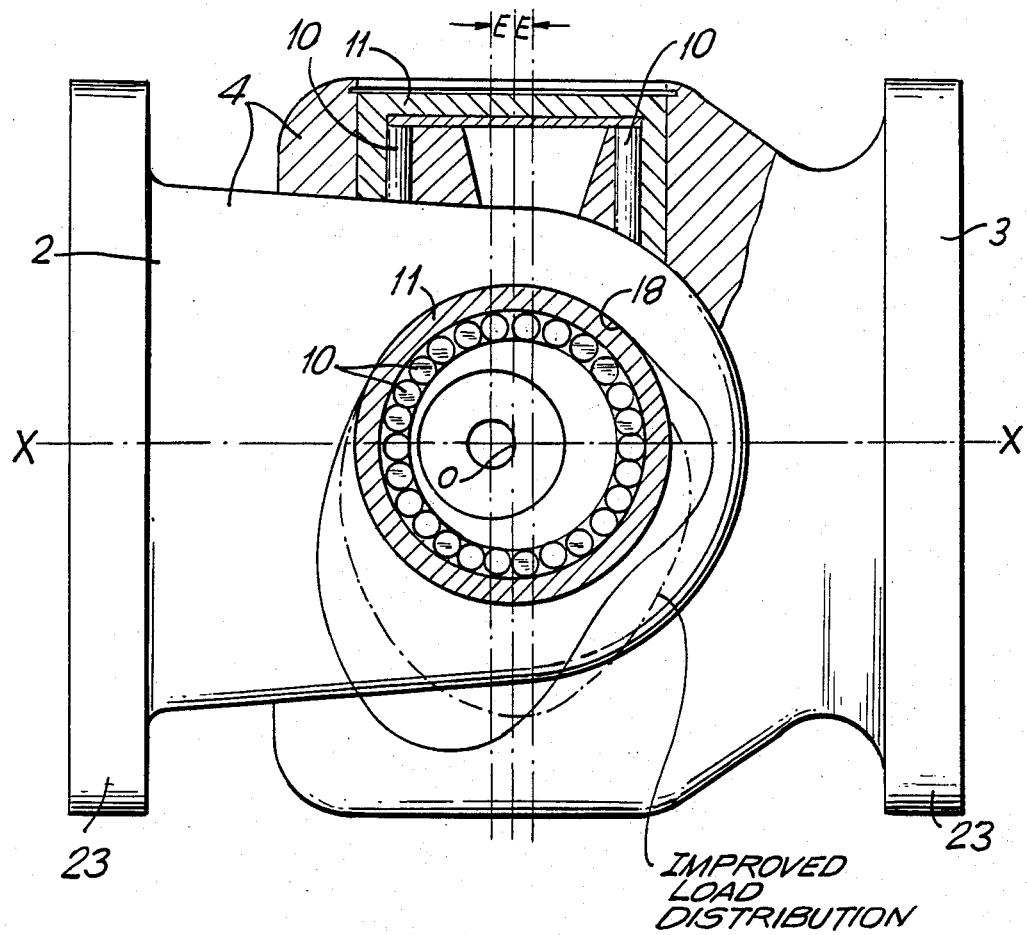
FIG. 1 is a side view of the Cardan universal joint in an in-line position and including a trunnion cross.
Figures 2A, 2B:
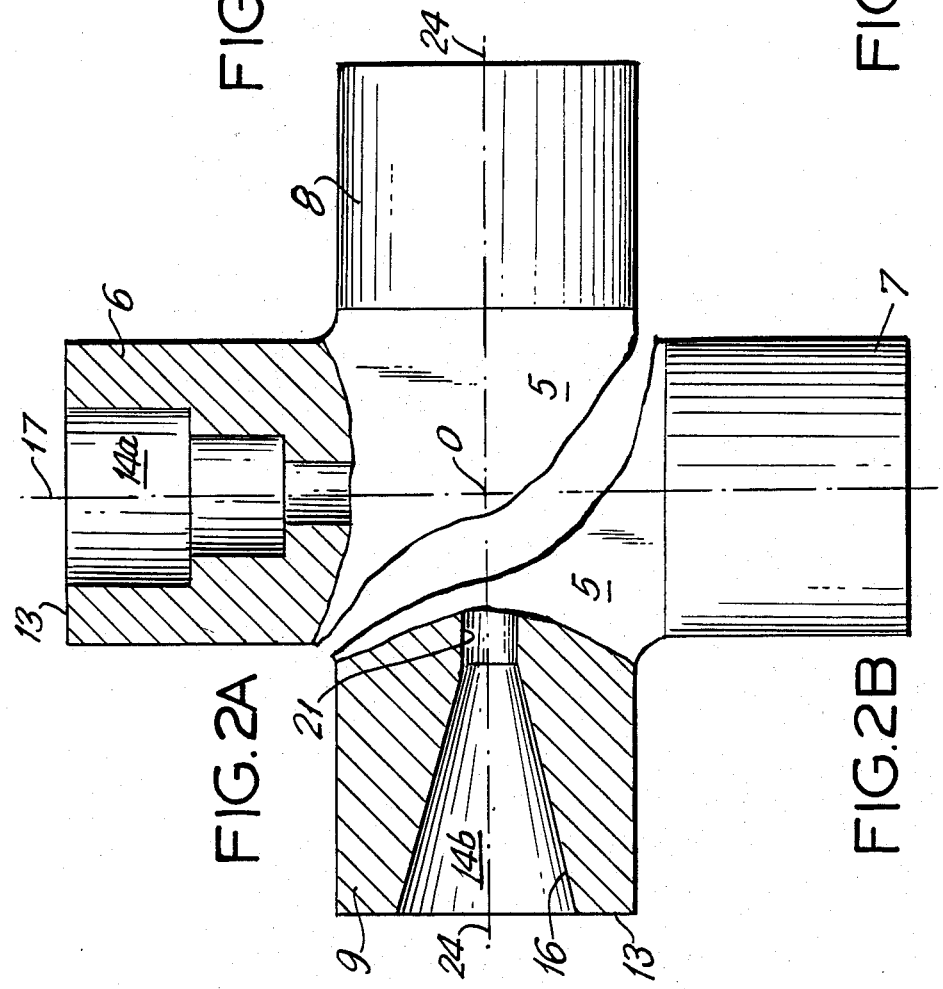
FIG. 2A is a front view of the trunnion cross with recesses.
FIG. 2B is a front view of the trunnion cross with another embodiment of the recesses.

Referring to the drawings in particular, the invention embodied in FIGS. 1, 2A and 2B is a universal joint having two joint yokes 2, 3 which are connected to each other by a trunnion cross 5. The trunnion cross comprises four trunnions 6, 7, 8 and 9 arranged at right angles to each other. The trunnions 6 to 9 have a cylindrical external surface, upon which bearing members 10, for instance, cylindrical rollers, are arranged so as to roll thereon. The bearing members 10 themselves are again contained in a bearing cup 11 which is contained and axially secured in a bore 18. The bore 18 is located, respectively, in the yoke arms 4 of the two joint yokes 2, 3.

Two of the trunnions 6 and 7 have a common trunnion axis 17 and the other two trunnions 8 and 9 also have a common trunnion axis 24. The two trunnions 6 and 7 are assigned to the joint yoke 2 and the trunnions 8 and 9 to the joint yoke 3. The bore 18 containing the bearing cups 11 are arranged in the region of the free end of the yoke arms 4 of the two joint yokes 2 and 3. At their other ends, the yoke arms are connected to each other by a base 23. In the undeflected or in-line position which is depicted in FIG. 1, the two joint yokes 2 and 3 have a common axis of rotation x—x. The axis of throughbore 18 is designated with 25. It coincides respectively with the axes 17 and 24 of the trunnions in the assembled state of the joints. An additional stop disk is arranged between the bottom surface of the bearing cup 11 and the front face of the trunnions.

Figures 3A, 3B:
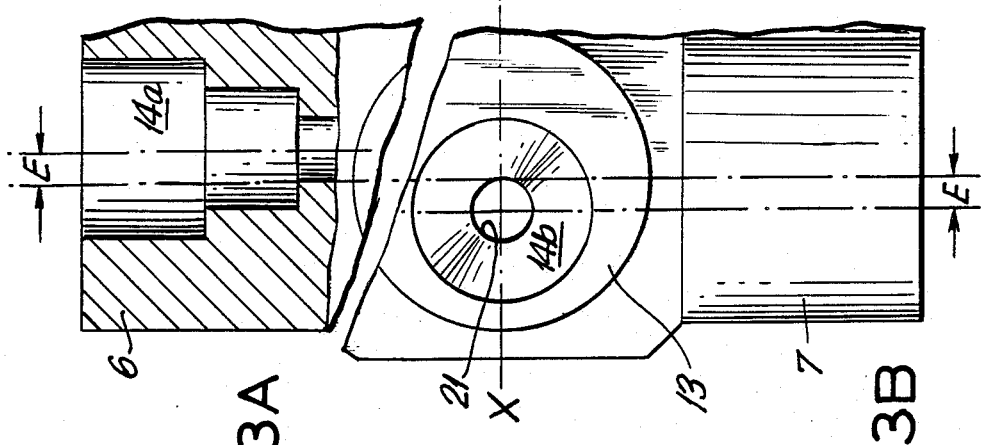
FIG. 3A is a side view of FIG. 2.
FIG. 3B is a side view of FIG. 2B.

Two variants are depicted are in FIGS. 2A and 3A and the other in FIGS. 2B and 3B; The central plane of the two trunnions is the plane containing the axes 17 and 24. The trunnions 6 to 9 are equipped with recesses 14a or 14b emanating from their end face 13. The recesses 14a FIGS. 2A and 3A and 14b FIGS. 2B and 3B are arranged eccentrically to the central plane. Herein, as can be seen from FIG. 3A, the recesses 14a of the trunnions 6 and 7 are, for instance, arranged to be offset to the right of the central plane, while in FIG. 3B the recesses 14b in the trunnions 8 and 9 are arranged to be offset to the left of the central plane. The extent of offset, shown at E, is equal in both cases. In the assembled state of the joint, the arrangement of each offset occurs in such a way that the offset is in the direction of the connected ends or base 23 of the joint yokes 2 or 3 carrying the trunnions. In spite of the fact that the recesses can be of any configuration whatsoever, it should, however, be assured that mirror image symmetrical design is present with respect to the axis x—x which is the axis standing at a right angle to the central plane. In accordance with the first embodiment, this recess can be a stepped bore so that a greater weakening exists in the region which is nearest to the end face 13 than in the region lying further towards the center 0. The largest opening diameter is thus arranged in the region of the end face 13. A conical bore 16 can also be provided alternately to the step-shaped design. The conical bore assures a continuous transition as far as elastic strain is concerned. Preferably, the recesses of the two trunnions 6 and 7 or 8 and 9 lying along one axis 17 or 24 communicate with each other by a bore 12 or 21. These constitute the lubricating channel for supply of the lubricant from the center of the trunnion cross to the end faces 13 and the bearing members 10.

Figure 5:
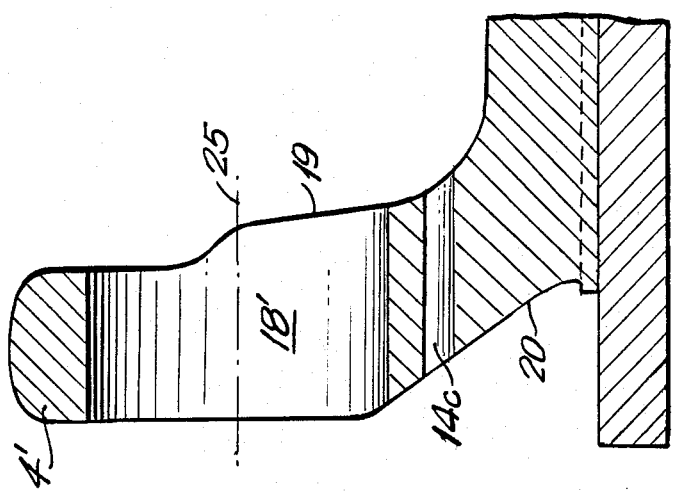
FIG. 5 is a section taken along line A—A of FIG. 4 showing one half of a yoke.
Figure 4:
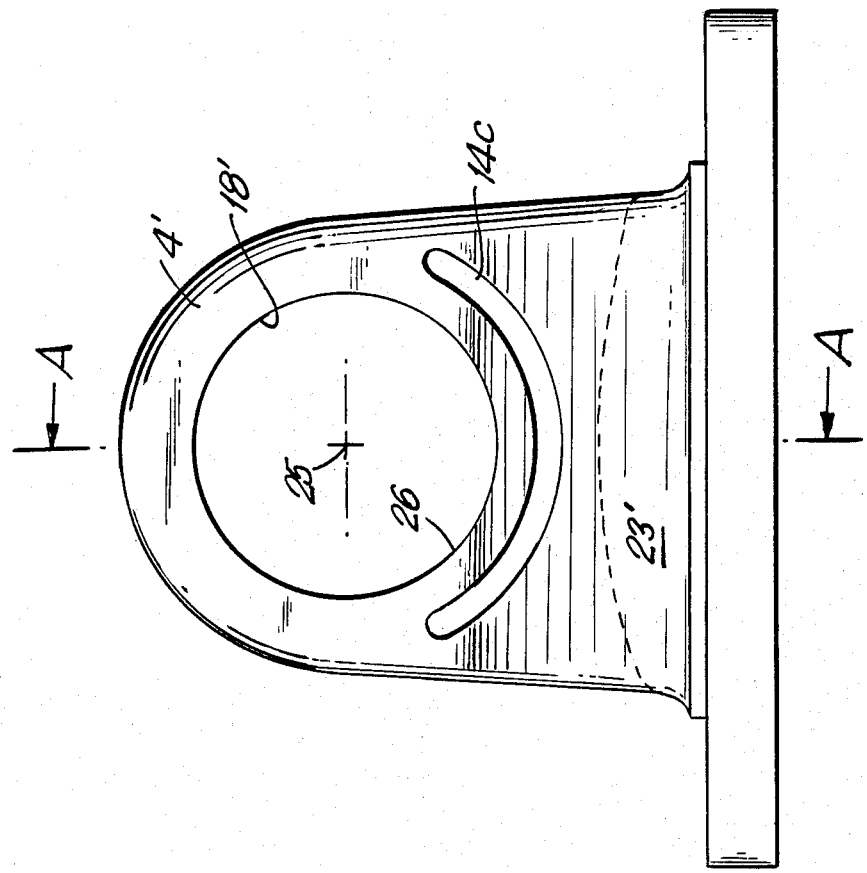
FIG. 4 is a side view of a joint yoke in partial section with recesses.

In the embodiment according to FIGS. 4 and 5, the weakening occurs in the surface region of the yoke arms which is located between the wall 26 of the bore 18' and the connected end 23' of the yoke arms 4' of the respective joint yoke.

Herein, the recesses 14c emanate preferably from the outer surface 20 of the yoke arm. A particularly favorable effect is achieved if the recesses 14c are designed as segments of a circular annulus. It is alternatively possible to provide the recesses 14c as required through a finite depth of the radial thickness of the yoke arms 4' or, however, to select an X-shaped recess extending completely to the inner surface 19. It is equally possible to provide the recesses emanating from the inner surfaces 19. In the embodiment where the recesses are segments of a circular annulus, the center of the circular annulus lies in the axis 25 of the bore 18'. In this embodiment, also, the mirror image symmetry with respect to the plane containing the central axis 25 of the bore 18' applies.

While specific embodiments of the invention have been shown and described in detail to illustrate the application of the principles of the invention, it will be understood that the invention may be embodied otherwise without departing from such principles.

What is claimed is:

1. A universal joint comprising:

first and second joint yokes (2, 3) each having a connecting end (23) with a pair of yoke arms (4), a bore (18) in each yoke arm, the bores of each joint yoke lying on a different common axis and the axes of the bores of both joint yokes lying in a common plane, said connecting ends being located on opposite sides of said common plane; and a trunnion cross (5) having four trunnions (6, 7, 8, 9) each mounted for rotation in a different one of the bores of said joint yokes for pivotally connecting said joint yokes together, said connected together joint yokes having an in-line position with a common rotation axis (x-x);

each trunnion having a radially outer end face with a recess (14) therein extending radially inwardly toward the center of said cross, the recesses of the trunnions for one joint yoke being in axial alignment with each other; and the recesses of the trunnions for each joint yoke being offset along said rotation axis from said common plane toward the connecting end of the joint yoke in which the trunnions are connected.

2. A universal joint according to claim 1, wherein the recesses of the trunnions for at least one of said first and second joint yokes comprise stepped cylindrical bores.

3. A universal joint according to claim 1, wherein the recesses of the trunnions for at least one of said first and second joint yokes comprise conical bores having a largest diameter lying in the end face of the respective trunnion.

4. A universal joint comprising:
first and second joint yokes (2, 3) each having a connecting end (23') with a pair of yoke arms (4'), a bore (18') in each yoke arm, the bores of one joint yoke lying on a common axis and the axes of the bores of both joint yokes lying in a common plane; and
a trunnion cross (5) having four trunnions (6, 7, 8, 9) each mounted for rotation in one bore of said joint yokes for pivotally connecting said joint yokes together, said connected together joint yokes having an in-line position with a common rotation axis (x—x);
each yoke arm having a recess therein, the recesses of said yoke arms for one joint yoke being mirror image symmetrical to each other with respect to a plane containing the rotation axis and the bores of the respective yoke arms, the recesses for each joint yoke lying between the bores of that joint yoke and the connecting end of that joint yoke, each said recess extends through the respective yoke arm.

5. A universal joint according to claim 4, wherein said recesses of said yoke arms are each in the form of at least one circular annulus extending concentrically with respect to an axis of the bore for that yoke arm.

6. A universal joint comprising:
first and second joint yokes (2, 3) each having a connecting end (23') with a pair of yoke arms (4'), a bore (18') in each yoke arm, the bores of one joint yoke lying on a common axis and the axes of the bores of both joint yokes lying in a common plane; and
a trunnion cross (5) having four trunnions (6, 7, 8, 9) each mounted for rotation in one bore of said joint yokes for pivotally connecting said joint yokes together, said connected together joint yokes having an in-line position with a common rotation axis (x—x);
each yoke arm having a recess therein, the recesses of said yoke arms for one joint yoke being mirror image symmetrical to each other with respect to a plane containing the rotation axis and the bores of the respective yoke arms, the recesses for each joint yoke lying between the bores of that joint yoke and the connecting end of that joint yoke, each said recess extends through the respective yoke arm, each said recess comprises a through slot extending from an inner surface to an outer surface of the respective yoke arm.

7. A universal joint according to claim 6, wherein said recesses of said yoke arms are each in the form of at least one circular annulus extending concentrically with respect to an axis of the bore of the respective yoke arm.

* * * * *